May 21, 1935.  K. E. LYMAN  2,001,931
AUTOMATIC CLUTCH
Filed Nov. 25, 1932  2 Sheets-Sheet 1
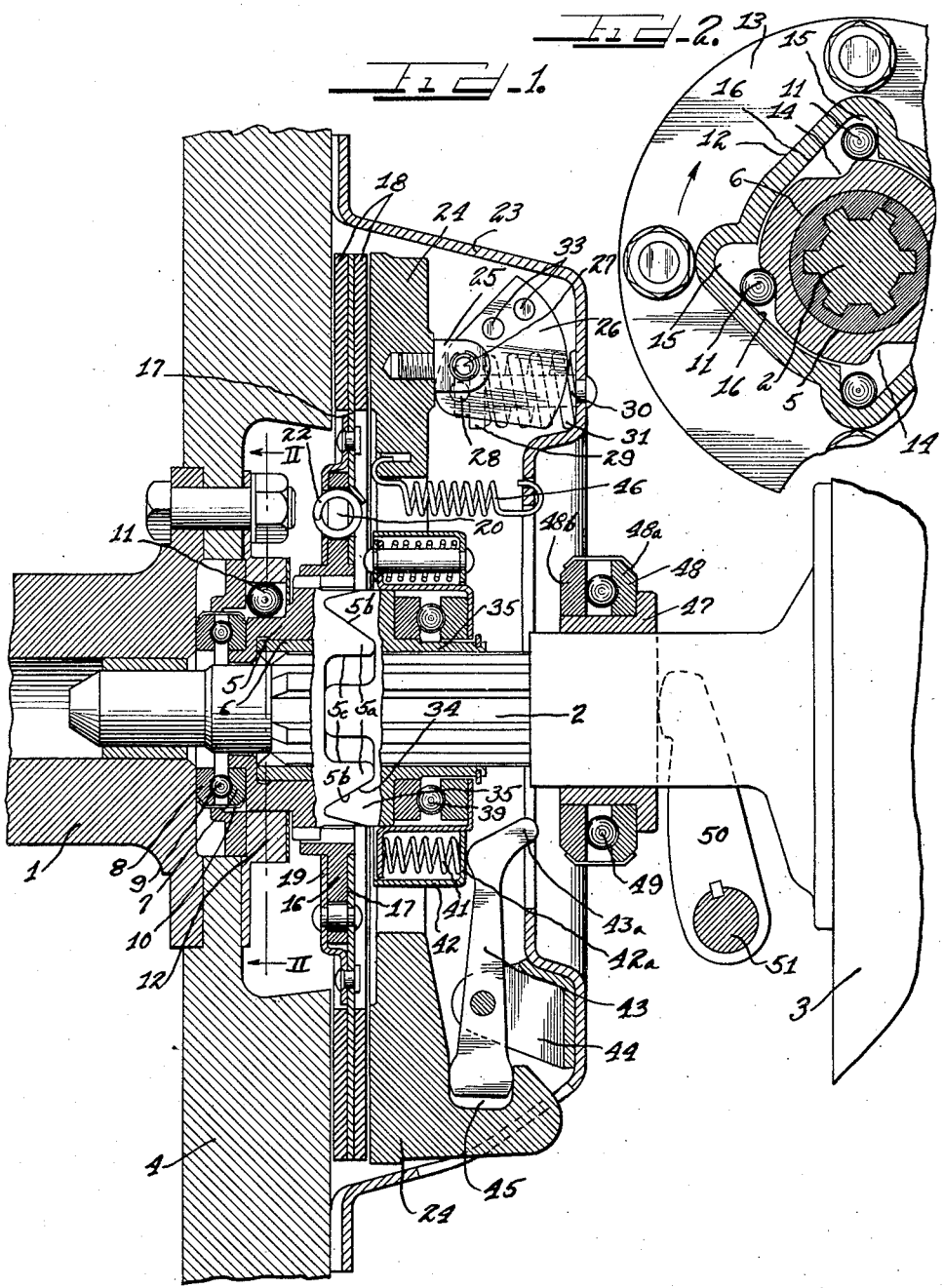
Inventor
Kenneth E. Lyman.

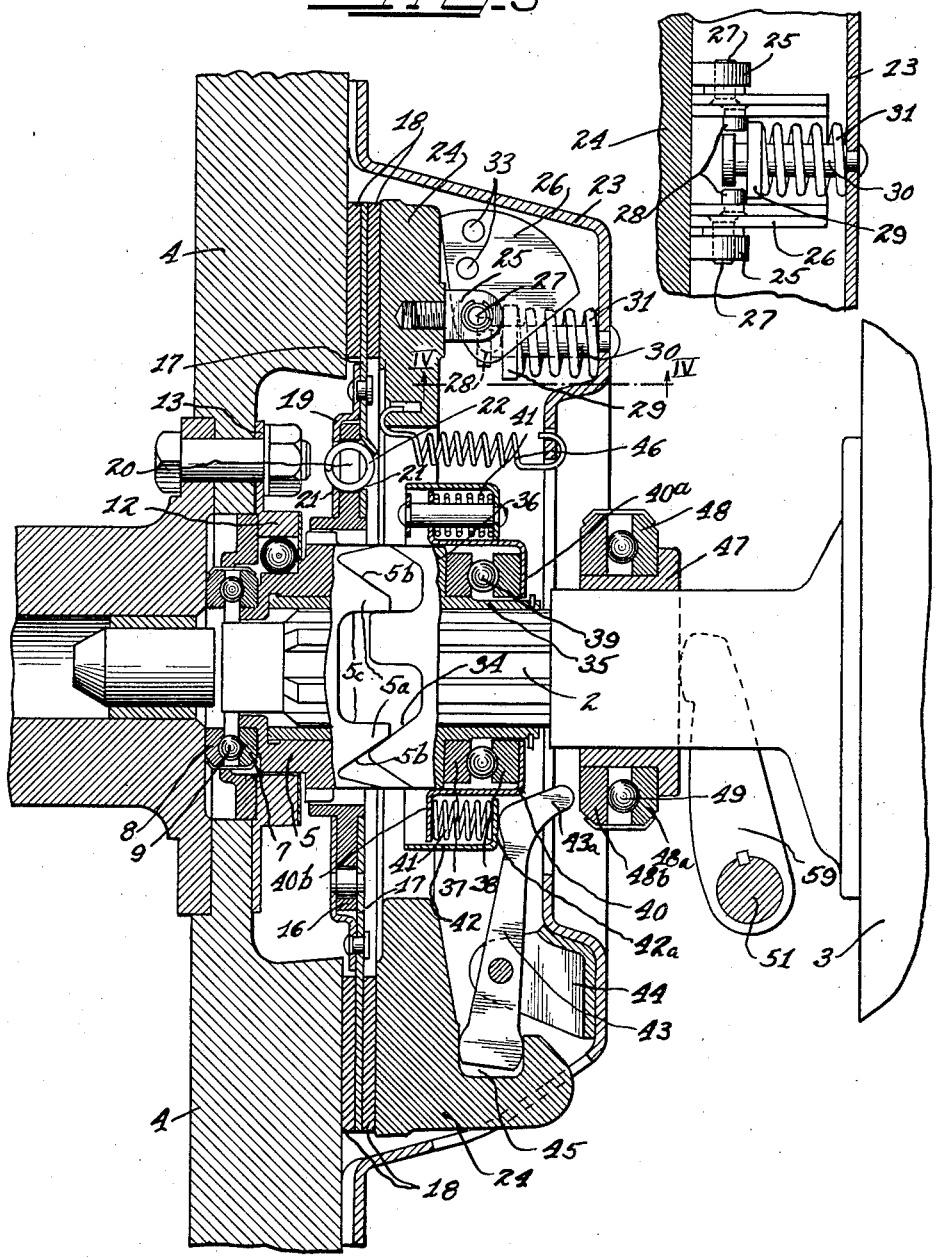

Patented May 21, 1935

2,001,931

UNITED STATES PATENT OFFICE 2,001,931

AUTOMATIC CLUTCH

Kenneth E. Lyman, Rockford, Ill.

Application November 25, 1932, Serial No. 644,228

3 Claims. (Cl. 192—52)

This invention relates to automatic clutches of the centrifugal type in which the clearance takeup between the friction clutch plates is effected by the action of centrifugal members for causing the rotation of a camming clutch member which in turn shifts a cooperating cammed member for actuating a plurality of clutch plate applying levers, and concerns itself primarily with annular cushioning means between the cooperating cammed member and the said levers for more gradually applying the clutch plate. A further feature resides in the interposition of what is commercially known as a one-way clutch between the propelling shaft and the camming clutch member for starting the engine in the event that it stops while the vehicle is in motion.

The present invention constitutes improvements over the device shown in applicant's copending application Serial No. 594,025, filed February 19, 1932, for "Automatic clutch."

Further novel and advantageous features will be pointed out as the description proceeds.

The invention comprises the novel structure and combination of parts hereinafter described and more particularly pointed out and defined in the appended claims.

In the accompanying drawings, which illustrate a preferred form of this invention and in which similar reference numerals refer to similar features in the different views, Figure 1 is a sectional view of the automatic clutch involving this invention with the clutch plates disengaged and showing a part of a transmission housing in elevation.

Figure 2 is a sectional view taken upon the line II—II of Figure 1.

Figure 3 is a view similar to Figure 1 with the parts in different positions and illustrating the friction clutch plates engaged.

Figure 4 is a view on line IV—IV of Figure 3 looking upwardly.

The automatic clutch involving this invention is illustrated as interposed between a propelling shaft 1 which may be the engine shaft of an automotive vehicle and a driven shaft 2 which may be the transmission shaft of such a vehicle, and which is shown extending into a transmission casing 3 and journalled in the engine shaft. The shaft 1 is illustrated as carrying the customary fly wheel 4.

A camming clutch member 5 is freely mounted upon a sleeve bearing 6 splined upon the splined shaft 2. This clutch member has cam projections 5a upon one edge. It will be noted that each projection 5a has a sloping or camming surface 5b and a substantially straight surface 5c. The portion of the clutch member 5 adjacent the engine shaft 1 has a stepped periphery. A bearing ring 7 is positioned upon the outermost stepped portion and cooperates with a bearing ring 8 contacting the end of the shaft 1 for forming a raceway for thrust bearing balls 9. A retaining member 10 surrounds the bearing rings 7 and 8.

The next outermost stepped portion of the camming member 5 forms a bearing for clutch balls 11 which are surrounded by a clutch drum 12 having a flange 13 bolted or secured to the fly wheel 4. It will be noted with reference to Figure 2 that this second stepped portion has ball depressions 14 and that the drum has pockets 15 and cam surfaces 16 between the pockets producing what is commonly termed a one-way clutch structure. When the engine is running, the fly wheel will revolve in the direction indicated by the arrow in Figure 2 and the balls 11 will form no connection with the clutch member 5. However, if the engine should die down when the vehicle is running under its own momentum, the clutch member 5 will rotate relative to the drum 12 and cause the balls 11 to form a connection with the drum 12 for starting the engine.

The camming clutch member 5 includes an annular member 16 which is shown as splined thereto forming a unitary structure. An annular plate 17, carrying a friction plate 18 upon each side adjacent its outer periphery extends in contact with one side of the member 16. An annular plate 19 in contact with the other side of the member 16 is offset toward the plate 17 and riveted or attached thereto forming a unitary structure.

The plate 17 which may be termed a friction clutch member is yieldingly connected to the member 16 for limited rotative movement. To this end, one or more short slots 20 are formed in the member 16 and substantially corresponding slots 21 are formed in registry therewith in the plates 17 and 19. A coil spring 22 of sufficient diameter is inserted in the slots of the member 16 and plates 17 and 19. With this construction, the friction member 17 may move relative to the member 16 by compressing the spring 22. Of course, when the resistance of the camming member 5 is overcome by the compression of the spring, it will also be forced to rotate.

A casing 23 is attached to the fly wheel and within this casing there is supported a friction plate 24 actuated by centrifugal force for engaging the friction member 17 and pressing the same against the fly wheel. Centrifugal weights are utilized for this purpose. While any suitable centrifugal weight may be used, a preferred form has been illustrated.

In referring to the drawings especially Figure 4, it will be observed that a U-shaped bolt 25 is attached to the plate 24. Plate members 26 are pivoted to the arms of the U-bolt as indicated at 27. Each plate 26 has an inwardly projecting stud 28 adapted when the plates 26 are swung upwardly to actuate a washer 29 slidably mounted upon a bolt 30 extending inwardly from the casing and supporting a coil spring 31 between the casing and washer. A centrifugal weight is bolted between the plates 26, the apertures 33 for the bolts being shown in Figures 1 and 3. Any suitable number of such centrifugal weights may be employed. It will be obvious that as the centrifugal weight flies outwardly during rotation of the fly wheel, the pins 28 will act against the washer 29 which serves as a yielding fulcrum and the pivot points 27 will move inwardly causing the friction plate 24 to press the friction member 17 against the fly wheel and eliminating the clearance between the plates. The friction member 17 will now rotate with the fly wheel and the camming member 5 will rotate therewith through the yielding connection previously set forth. As the camming member 5 rotates the sloping surface 5b on certain of the projections 5a will engage certain sloping surfaces 34 on cam projections 35 extending from one edge of a cammed member 35 splined upon the shaft 2, and cause the cammed member 35 to slide toward the right upon said shaft.

The cammed member 35 is provided with a shoulder 36 against which is seated a ball race ring 37. Spaced from the ball race ring 37, there is a second ball race ring 38 with thrust bearing balls 39 between such rings. An annular Z-shaped metal member 40 surrounds this thrust bearing, one flange 40a thereof engaging the outer side of the bearing ring 38, while the other flange 40b forms an abutment for coil springs 41. An L-shaped metal member 42 surrounds the Z-shaped member 40. The L-shaped member 42 has its foot or flange 42a in opposed relation to the flange 40a for engaging the opposite ends of the coil springs 41. The members 40 and 42 form in effect an annular spring retainer.

Levers 43 (only one of which is shown) are pivoted intermediate their ends to lugs 44 on the casing 23. The outer ends of these levers engage in sockets 45 in the plate 24. The inner ends of these levers engage the flange 42a and they have inclined terminals 43a extending from the contacting points with the flange 42a for a purpose that will later appear.

It will be apparent that when the cammed member 35 is shifted toward the right as shown in Figure 3, the flange 40b will compress the springs 41 and cause the member 42 to actuate the levers 43 for gradually increasing the friction of the friction member 17 in connection with the fly wheel and plate 24. When rotation of the clutch ceases or decreases to the extent that the centrifugal weights become inactive, the friction plate 24 is adapted to be withdrawn for rendering the friction clutch idle by springs 46 attached to said plate and to said casing.

The friction plate 24, however, may also be released at any time by manually operable means consisting of a sleeve 47 slidable on the bearing of the transmission housing. A ball thrust bearing 48 consisting of rings 48a and 48b with rolling elements 49 therebetween is carried by said sleeve. An arm 50 on a foot pedal shaft 51 is adapted to slide the sleeve 47 to the left until the race ring 48b engages the inclined ends of the levers 43 and actuates the same toward the left. This operation also shifts the cammed member 35 to the left. It will be appreciated that during the shifting movements of the cammed member 35 or the sleeve 47 no friction will be engendered against such parts due to the fact that there is relative rotation between the different race rings of each ball bearing.

The operation of the clutch depends upon the starting of the engine shaft. As soon as the engine shaft starts to rotate carrying the fly wheel 4 and casing 23 therewith, the centrifugal weights will be thrown outwardly for taking up the clearance in the friction clutch, and initiating the frictional resistance for causing the friction member 17 to revolve with the fly wheel while certain slippage may occur. This frictional resistance will be sufficient to cause rotation of the camming member 5 for shifting the cammed member 35 for gradually increasing the friction of the friction clutch.

I am aware that many changes may be made and numerous details of construction may be varied through a wide range without departing from the principles of this invention, and I therefore, do not purpose limiting the patent granted hereon otherwise than necessitated by the prior art.

I claim as my invention:

1. In an automatic clutch, a driving shaft having a fly wheel, a friction device for engaging said fly wheel, a casing attached to said fly wheel, a friction plate engaging said friction device, said plate having a socket, a lever pivoted to said casing and extending into said socket, a driven member, a sleeve slidable upon said driven member, an annular yielding member between the free end of said lever and sleeve, and means operable upon rotation of said driving shaft for shifting said sleeve.

2. In a friction clutch, a driving member, a driven member, friction means for connecting said members, a lever for pressing against said friction means, a slidable member on the driven member, an annular cushion between said lever and slidable member, and means rotatable with said driving member for causing said slidable member to compress said cushion and actuate said lever.

3. In a friction clutch, a driving shaft having a fly wheel, a driven shaft, a friction member for engaging said fly wheel, a plate for pressing against said friction member and having a socket, a casing, a lever pivoted to said casing and extending into said socket, a slidable sleeve upon the driven shaft, an annular yielding device between said sleeve and lever, and means adapted to rotate with said driving shaft when connected thereto for sliding said sleeve.

KENNETH E. LYMAN.